(12) United States Patent
Digmann et al.

(10) Patent No.: US 6,654,976 B2
(45) Date of Patent: Dec. 2, 2003

(54) SEAL FOR A DOCK LEVELER LIP (75) Inventors: Charles J. Digmann, Cuba City, WI (US); Andrew P. Schaepe, Dubuque, IA (US); Timothy J. Schmidt, Dubuque, IA (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/900,414

(22) Filed: Jul. 6, 2001

(65) Prior Publication Data

US 2003/0005530 A1 Jan. 9, 2003

(51) Int. Cl.[7] .................................................. E01D 1/00
(52) U.S. Cl. ....................................... 14/69.5; 52/173.2
(58) Field of Search ................................ 14/69.5, 71.1, 14/71.3, 71.5; 52/173.1, 173.2

(56) References Cited

U.S. PATENT DOCUMENTS

| 3,500,599 A | * | 3/1970 | Sciolino | 14/71.1 |
| 4,349,992 A | * | 9/1982 | Layne | 52/173 |
| 4,799,341 A | * | 1/1989 | Frommelt et al. | 52/173 |
| 4,799,342 A | * | 1/1989 | Klevnjans | 52/173 |
| 5,001,799 A | * | 3/1991 | Alexander et al. | 14/71.1 |
| 5,313,681 A | * | 5/1994 | Alexander | 14/71.1 |
| 5,396,676 A | * | 3/1995 | Alexander et al. | 14/71.1 |
| 6,272,799 B1 | * | 8/2001 | Ashelin et al. | 52/173.2 |

OTHER PUBLICATIONS

International Search Report from PCT/US02/21483.

* cited by examiner

Primary Examiner—Thomas B. Will
Assistant Examiner—Alexandra K. Pechhold
(74) Attorney, Agent, or Firm—Marshall, Gerstein & Borun LLP (57) ABSTRACT A dock leveler that includes a pivotal ramp with a moveable lip for loading and unloading a truck at a loading dock also includes a lip seal that helps seal an air gap along the side edges of the lip. When the back end of the truck is up against a dock bumper, the lip helps block off an air gap that spans an area generally defined by the rear edge of the truck, an inside edge of the bumper, and the side edge of the lip that generally faces the bumper. When the lip moves from its extended, operative position to its stored position, the lip forces the lip seal to move underneath the deck. The lip seal is biased to an operative, sealing position by a spring or a counterweight, so as the lip extends to its operative position, so does the lip seal.

14 Claims, 10 Drawing Sheets

SEAL FOR A DOCK LEVELER LIP

BACKGROUND OF THE INVENTION

1. Field of the Invention

The subject invention generally pertains to loading docks, and more specifically to a seal that seals against a dock leveler lip.

2. Description of Related Art

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck, also known as a ramp or dockboard, which is pivotally hinged along its back edge to vary the height of its front edge. An extension plate, or lip, extends outward from the deck's front edge to span the gap between the rear of the truck bed and the front edge of the deck. Depending on the particular dock leveler, some lips move linearly and others pivot between a stored position and an extended, operative position. In moving to the stored position, the lip usually retracts to where it does not interfere with a vehicle backing into the dock. In the extended, operative position, the lip extends from the deck's front edge and rests upon the truck bed to form a bridge between the two. This allows personnel and material handling equipment to readily move on and off the vehicle during loading and unloading operations.

To protect the building and the dock leveler from direct vehicle impact, loading docks often include bumpers. Bumpers also help establish a predetermined distance between the rear of the vehicle and the dock leveler, so the dock leveler can first raise and then lower its lip upon the rear of the vehicle with a safe amount of overlap, or lip purchase, between the lip and the bed of the vehicle. Bumpers are usually installed near the bottom of the doorway, adjacent either side of the dock leveler lip and protrude a few inches out from the face of the dock, where they can be abutted by the rear of the vehicle.

To help block out rain, snow and outside air from entering the building through air gaps between the back of the vehicle and the exterior face of the building, usually either a dock seal or a dock shelter is installed around the perimeter of the doorway.

Dock shelters often have projecting members that protrude outwardly from the face of the building and run generally along the top and lateral sides of the doorway. From a protruding edge of the projecting members, a top extending member and two laterally extending members may extend inward and generally parallel to the building face to help seal against the truck's top and sides, respectively. The laterally extending members are often made of a fabric or flexible foam. Two inner bottom corners of the dock shelter at the lower back sides of the truck are often partially sealed by draft pads attached to the lower ends of the projecting members. The dock leveler lip resting upon the rear of the vehicle is often relied upon to seal most of the doorway's lower edge.

Typical dock seals comprise a resiliently compressible foam core protected by a fabric outer cover. They are usually mounted to the face of a building, along the top and both sides of the doorway. With dock seals, sealing is provided by backing the truck directly up against the seal. The seal then compressively conforms to the shape of the truck's rear edges. The foam core provides the necessary compliance and resilience to repeatedly conform to the shape of various trucks, while the outer cover protects the foam core from dirt, water and abrasion. As with dock shelters, dock seals also rely on the dock leveler lip to seal most of the doorway's lower edge.

With conventional dock seals and dock shelters, side clearance between the lip of the dock leveler and the inner side of each bumper creates areas that are difficult to seal off. Air gaps in these areas can cause a terrible upward draft into the building, particularly if the interior of the building is at a lower pressure than the outside air. The air gaps can be especially large for a dock leveler with a tapered lip whose width across the doorway is narrower along the tip or distal edge of the lip than along a proximal edge where the lip is hinged to the deck. Tapered lips create gaps that are similarly tapered (e.g., triangular or trapezoidal). Regardless of the air gap's shape, sealing such openings can be difficult to do, because the lip must be able to move relative to the bumper. The lip not only needs to move between a stored and an extended position, but also needs to move vertically with the up and down pivotal movement of the dock leveler's deck. Due to the difficulty of sealing the air gaps between a dock leveler lip and adjacent bumpers, such air gaps are known to be left open.

SUMMARY OF THE INVENTION

In some embodiments, a lip seal extends between a bumper of a loading dock and a lip of a dock leveler.

In some embodiments, a lip seal engages a bumper of a loading dock and a lip of a dock leveler.

In some embodiments, a lip seal engages the underside surface of a dock lever lip.

In some embodiments, a moveable seal member engages the bumper of a loading dock.

In some embodiments, a seal member is pivotal about an axis disposed underneath the deck of a loading dock.

In some embodiments, a seal member is adapted to engage a vehicle, the lip of a dock leveler, and the bumper of a loading dock.

In some embodiments, a seal member is able to seal a gap existing along a tapered edge of a dock leveler lip.

In some embodiments, a seal member for a dock leveler lip includes a compressible foam core with a pliable cover.

In some embodiments, a seal member includes a plurality of tabs adapted to engage an inside surface of a bumper.

In some embodiments, a seal member is adapted to engage the lip of a dock leveler over an area of contact that moves as the lip moves relative to the dock leveler's deck In some embodiments, a seal member is adapted to engage the bumper over an area of contact that moves as the pivotal deck pivots In some embodiments, a spring urges the seal member to an operative position.

In some embodiments, a counterweight urges the seal member to an operative position.

DESCRIPTION OF THE PREFERRED EMBODIMENT

Figure 1:
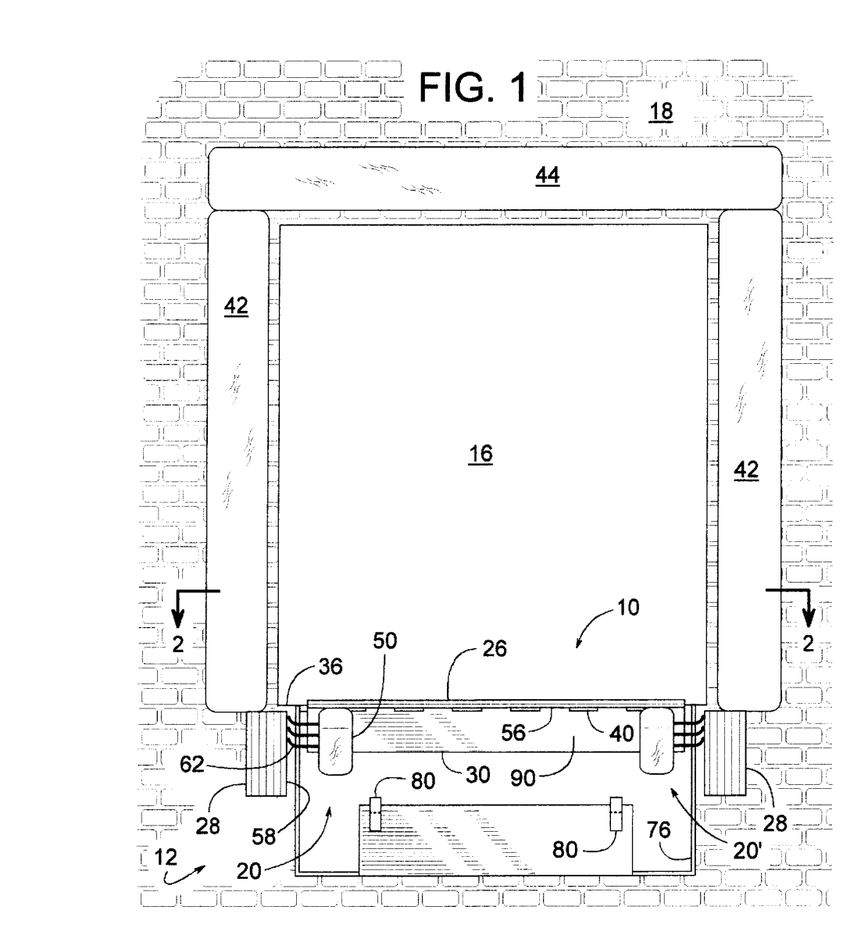
FIG. 1 is a front view of a loading dock with a dock leveler that includes a lip seal. To show a front view of the lip seal, the lip of the dock leveler is extended even though a vehicle is not shown present at the dock.
Figure 2:
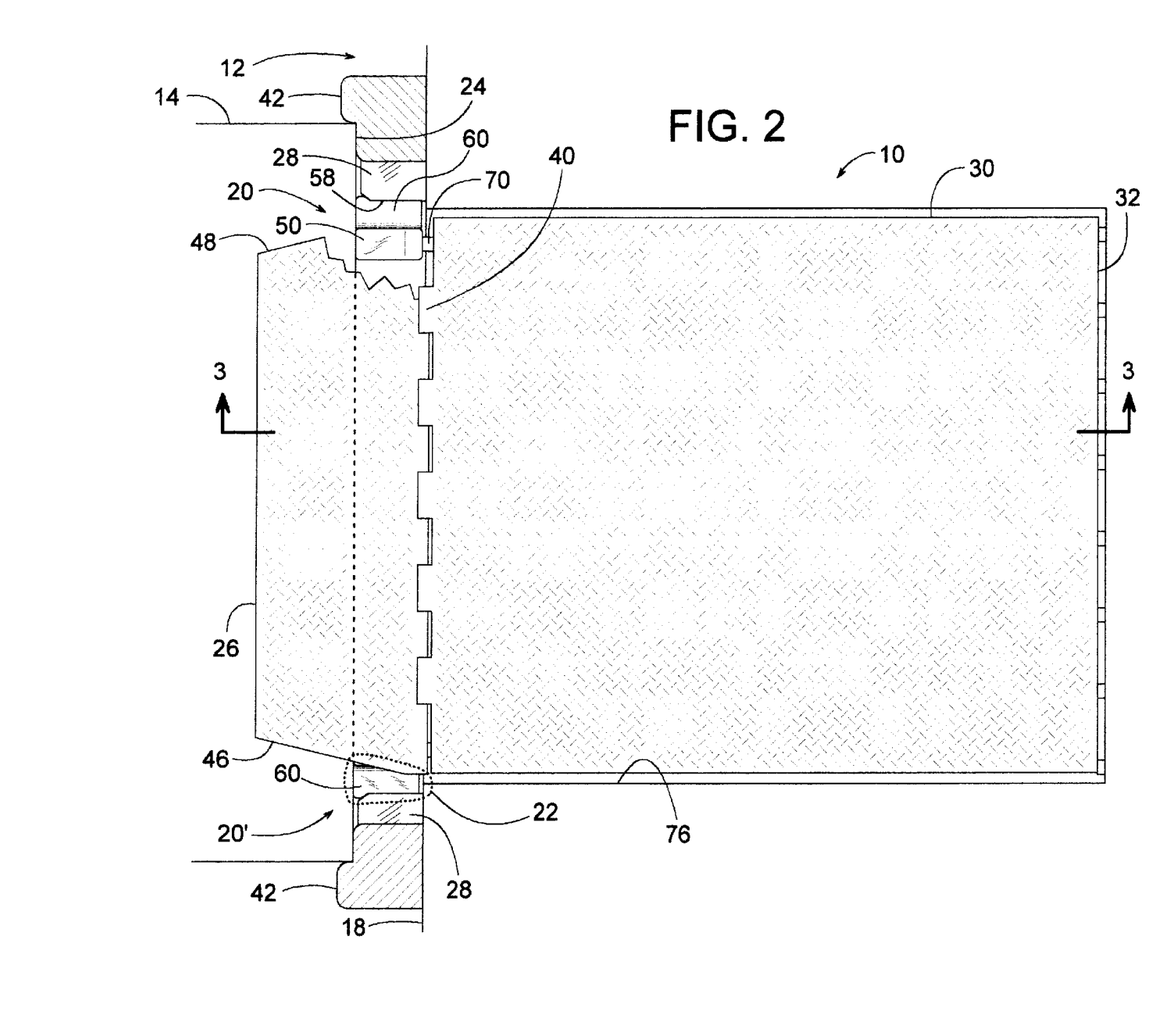
FIG. 2 is a cross-sectional view taken along line 2—2 of FIG. 1.

Referring to FIGS. 1 and 2, a dock leveler 10 at a loading dock 12 allows cargo to be readily transferred to and from a vehicle 14 through a doorway 16 of a building 18. According to one embodiment, dock leveler 10 includes a lip seal 20 that helps seal off an air gap that, in this particular example, spans an area 22 which is generally defined by a rear edge 24 of vehicle 14, a lip 26 of dock leveler 10, and a bumper 28 of loading dock 12. Another lip seal 20', which is a mirror image of lip seal 20, helps seal off another similar air gap at the other end of lip 26. The structure, function and purpose of lip seals 20 and 20' may be best understood after a description of dock leveler 10 itself and how it is used at loading dock 12.

Referring further to FIGS. 3–8, dock leveler 10 includes a deck 30 that is hinged along its back edge 32 to vary the height of its front edge 34. This allows dock leveler 10 to compensate for height differences between a loading dock platform 36 and the vehicle's floor 38 (e.g., the bed of a truck or trailer). In an extended, operative position, lip 26 extends outward from the deck's front edge 34 to span the gap from there to the vehicle's back edge 24. Although a lip that moves linearly relative to a deck is well within the scope of the invention, in this example, a hinge 40 coupling lip 26 to deck 30 allows lip 26 to pivot between a stored, pendant position of FIG. 3 and an extended, operative position of FIGS. 1, 2, and 5–7. Conventional hydraulic, pneumatic or electric actuators, under manual or automatic control, can drive the movement of deck 30 and lip 26 in any preferred manner. Such actuators are not shown, as they are well known to those skilled in the art and may interfere with illustrating certain features of lip seal 20. In moving to the stored position, lip 26 retracts to the stored position to avoid interfering with a vehicle backing into the dock. In the extended, operative position, lip 26 extends from the deck's front edge 36 and rests upon vehicle bed 38 to form a bridge between the two. This allows personnel and material handling equipment to readily move on and off vehicle 14 during loading and unloading operations.

To protect building 18 and dock leveler 10 from direct vehicle impact, loading dock 12 includes one or more bumpers 28 that protrude about four to six inches out from the face of the dock. The terms, "bumper" and "bumpers" refer to any structure subject to the impact of a vehicle backing into the dock, and includes not only the surface facing the vehicle, but also includes any hardware, framework, covering, shields or other structure associated therewith. Bumpers 28 also help establish a predetermined distance between the vehicle's back edge 24 and the front of dock leveler 10, so dock leveler 10 can first lift and then lower lip 26 upon the rear of vehicle 14 with a safe amount of overlap, or lip purchase, between lip 26 and the vehicle's bed 38. Bumpers 28 are installed near the bottom of doorway 16, adjacent either side of dock leveler lip 26, where they can be abutted by the rear of vehicle 14.

To help block out rain, snow and outside air from entering building 18 through air gaps between the exterior face of building 18 and the upper and two side edges along the rear of vehicle 14, a dock seal may be installed along the perimeter of doorway 16. For example, the dock seal includes two vertical side pads 42 and a head pad 44, which compressively conform to the shape of a vehicle's rear edges as the vehicle backs up against pads 42 and 44. It should be appreciated, however, that the use of a dock shelter instead of a dock seal is also well within the scope of the invention. Regardless of whether a dock shelter or dock seal is used, lip 26 extending out over truck bed 38 helps cover the gap over the rear lower edge 24 of vehicle 14. The remaining air gaps between bumpers 42 and the side edges 46 and 48 of lip 26 are sealed or at least partially blocked off by lip seals 20 and 20'. Since lip seals 20 and 20' are so similar, the following description of lip seal 20 also applies to seal 20'.

The actual design of lip seal 20 can vary depending on the particular dock leveler to which the lip seal is applied and how much air blockage is desired. In some cases, lip seal 20 may extend between lip 26 and bumper 42 without actually coming in direct contact with one or the other. However, lip seal 20 directly contacting lip 26 and bumper 42 generally provides a better seal. In some embodiments, the lip seal can be fixed relative to a bumper or fixed relative to the lip of the dock leveler. Again, the design of the lip seal may depend on the design of the dock leveler.

For dock leveler 10, the currently preferred embodiment of lip seal 20 includes a seal member 50 comprised of a resiliently compressible foam pad 52 (FIG. 9) protected by a tough, pliable outer cover 54 (e.g., 40-ounce vinyl). The compressibility of seal member 50 allows it to sealingly conform to back edge 24 of vehicle 14 and an underside surface 56 of lip 26.

Figure 9:
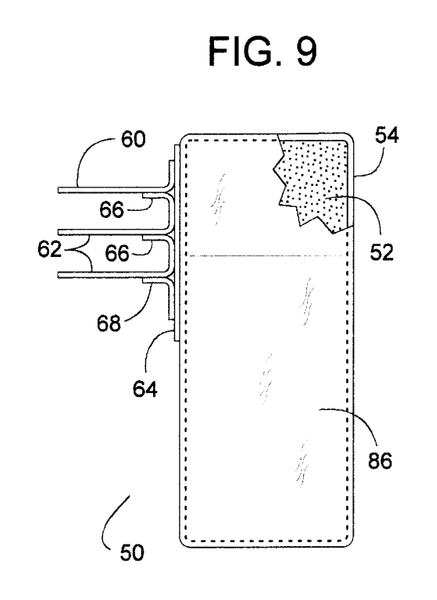
FIG. 9 is a front view of a seal member of a lip seal according to one embodiment.

To seal against an inside surface 58 of bumper 28, seal member 50 includes several flexible tabs 60 and 62 that are sewn or otherwise attached to a patch-like piece of material 64, which in turn is sewn or otherwise attached to cover 54. The terms "tab" and "tabs" are meant to encompass any protruding member for obstructing airflow. Examples of tabs include, but are not limited to, flexible sheeting, fabric, and bristles of a brush. To help hold tabs 60 and 62 erect in a cantilevered manner, support members, such as L-shaped strips of material 66 or 68, are sewn underneath the tabs. The support members can be an extension of a tab, as is the case with tabs 66, or they can be a separate item, such as strip 68.

Figure 3:
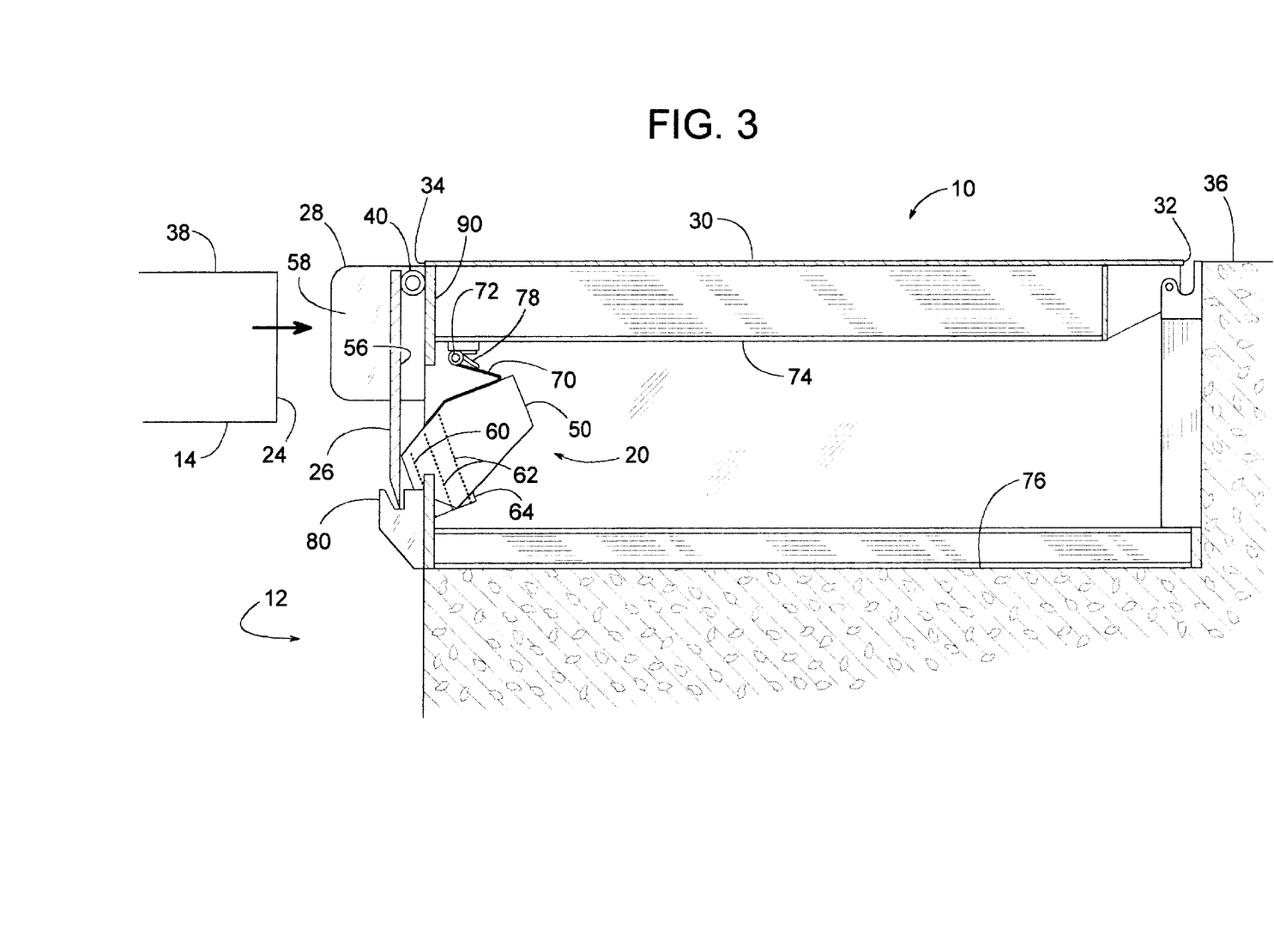
FIG. 3 is a cross-sectional view taken along line 3—3 of FIG. 2, but with the lip in a stored, pendant position.

So as not to interfere with lip 26 pivoting from its extended, operative position of FIGS. 1, 2, and 5–7 to its stored, pendant position of FIG. 3, seal member 50 is also moveable from an operative position for blocking airflow (see FIGS. 1 and 7) to a stored position underneath deck 30 (see FIG. 3). One way to enable such movement is to provide a lever arm 70 that couples seal member 50 to a horizontal pivotal axis 72. Axis 72 can be attached to a deck support beam 74 or some other structure underneath deck 30. Lip 26 pivoting downward to its stored position pushes against seal member 50, which forces seal member 50 to also pivot to its stored position. When lip 26 pivots upward to its operative position, a biasing member urges seal member 50 to also pivot to its operative position. Examples of such a biasing member include, but are not limited to, a counterweight and a resilient member such as a torsion spring 78.

The distance between the two bumpers 28 may be greater than the inside width of a pit 76 in which dock leveler 10 is installed. Consequently, seal member 50 should be able to not only extend out to the inside surface 58 of bumper 28, but should also be able to fit within the narrower width of pit 76, for seal member 50 in its operative position is between bumpers 4 and is inside pit 76 when stored. To accomplish this, tabs 60 and 62 are sufficiently long to reach out to bumper 28 and are sufficiently flexible to resiliently bend to fit within the narrower confines of pit 76.

FIGS. 3–8 illustrate a sequence of operation of dock leveler 10 and lip seal 20. FIG. 3 illustrates a cross-traffic position where the top surface of deck 30 is generally flush with platform 36. Lip 26 is in its stored, pendant position supported by a pair of lip keepers 80, lip seal 20 is in its stored position underneath deck 30 and behind lip 26, and bumper 28 is shown protruding where vehicle 14 may back into it.

Figure 4:
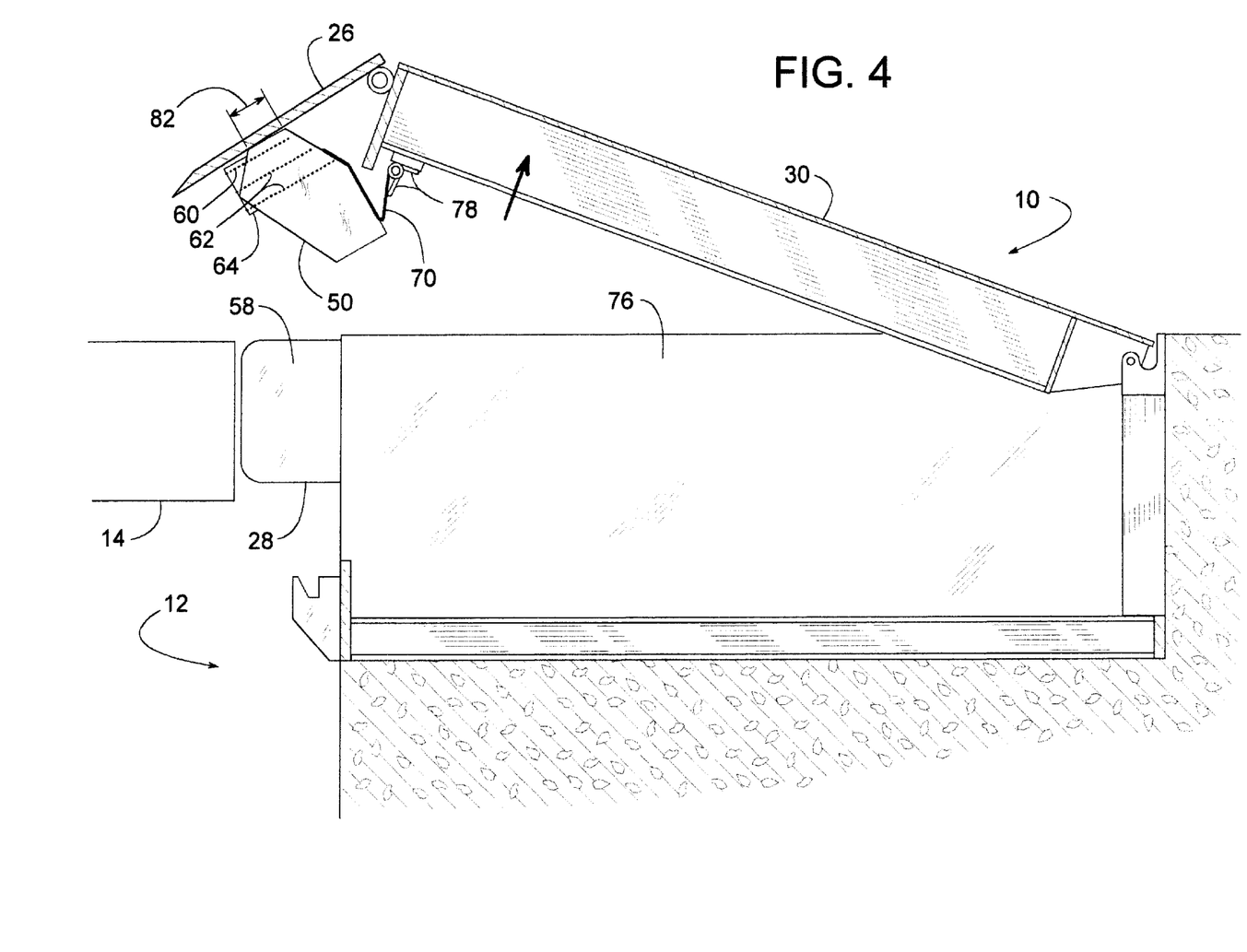
FIG. 4 is similar to FIG. 3, but with the deck pivoted upward and the lip pivoting outward.

After vehicle 14 is up against or at least adjacent bumper 28, as shown in FIG. 4, deck 30 rises; lip 26 begins to extend; and torsion spring 78, acting upon lever arm 70, urges seal member 50 to follow the upward movement of lip 26. Deck 30 rising and/or lip 26 extending causes tabs 60 and 62 to move out from within pit 76 and sweep across inside surface 58 of bumper 28.

Figure 5:
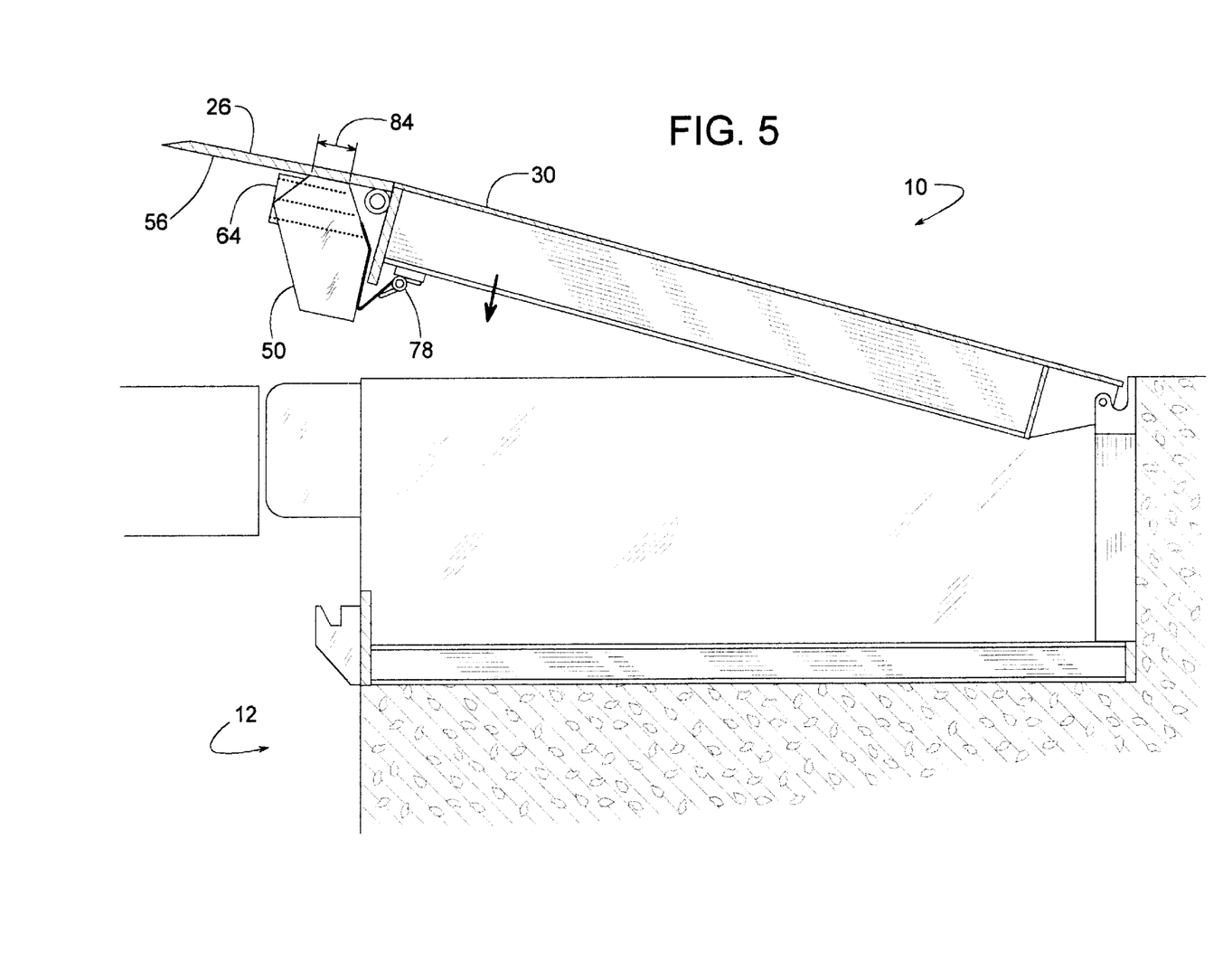
FIG. 5 is similar to FIG. 4, but with the deck descending and the lip fully extended in an operative position.

In FIG. 5, deck 30 begins to descend, lip 26 is fully extended, and spring 78 has pushed seal member 50 up against underside surface 56 of lip 26. It should be noted that as lip 26 extends, the contact area between seal member 50 and surface 56 of lip 26 moves from area 82 of FIG. 4 to area 84 of FIG. 5, as lip 56 and seal member 50 pivot about different pivot points.

Figure 6:
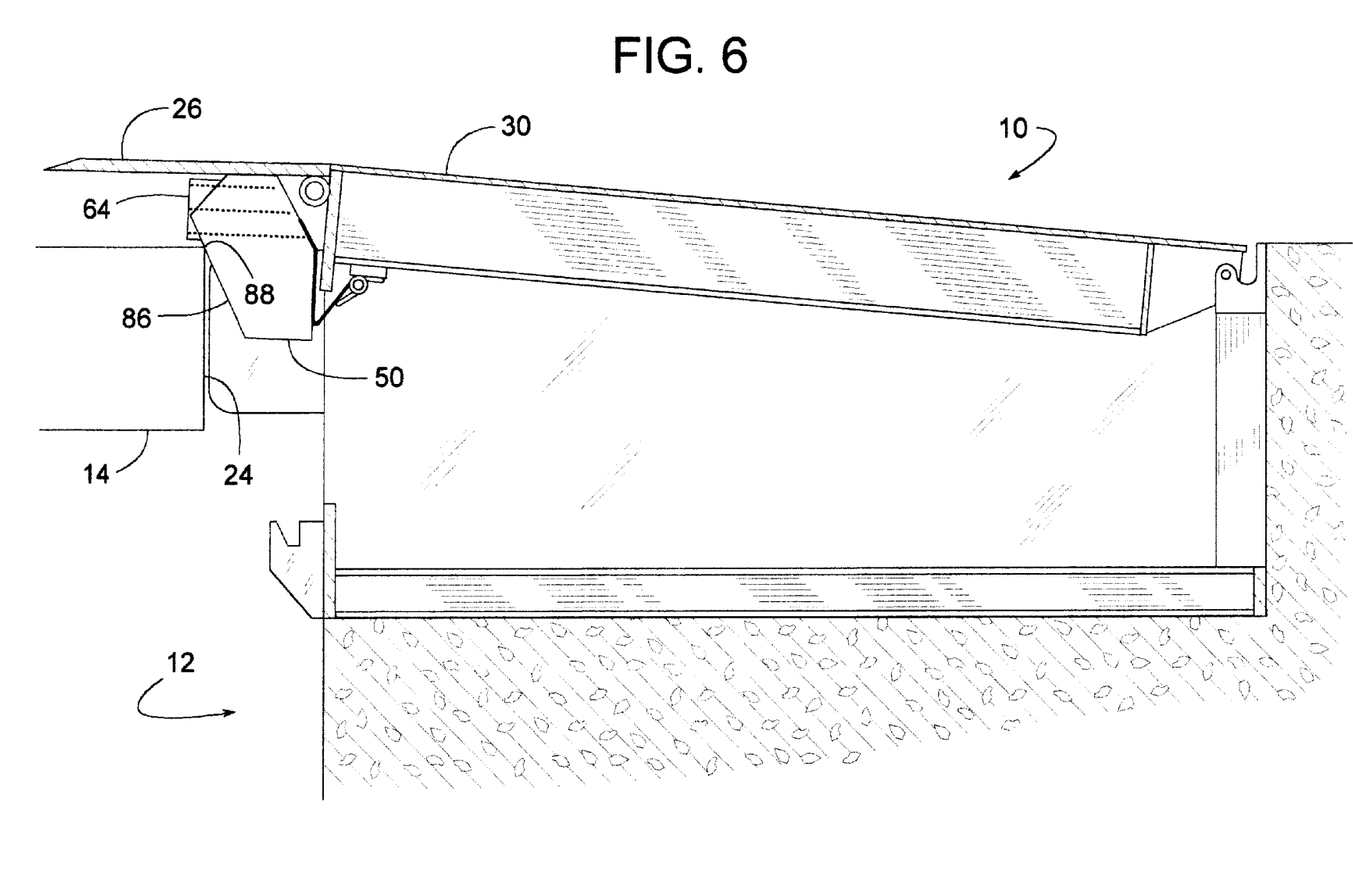
FIG. 6 is similar to FIG. 5, but with the deck lower.
Figure 7:
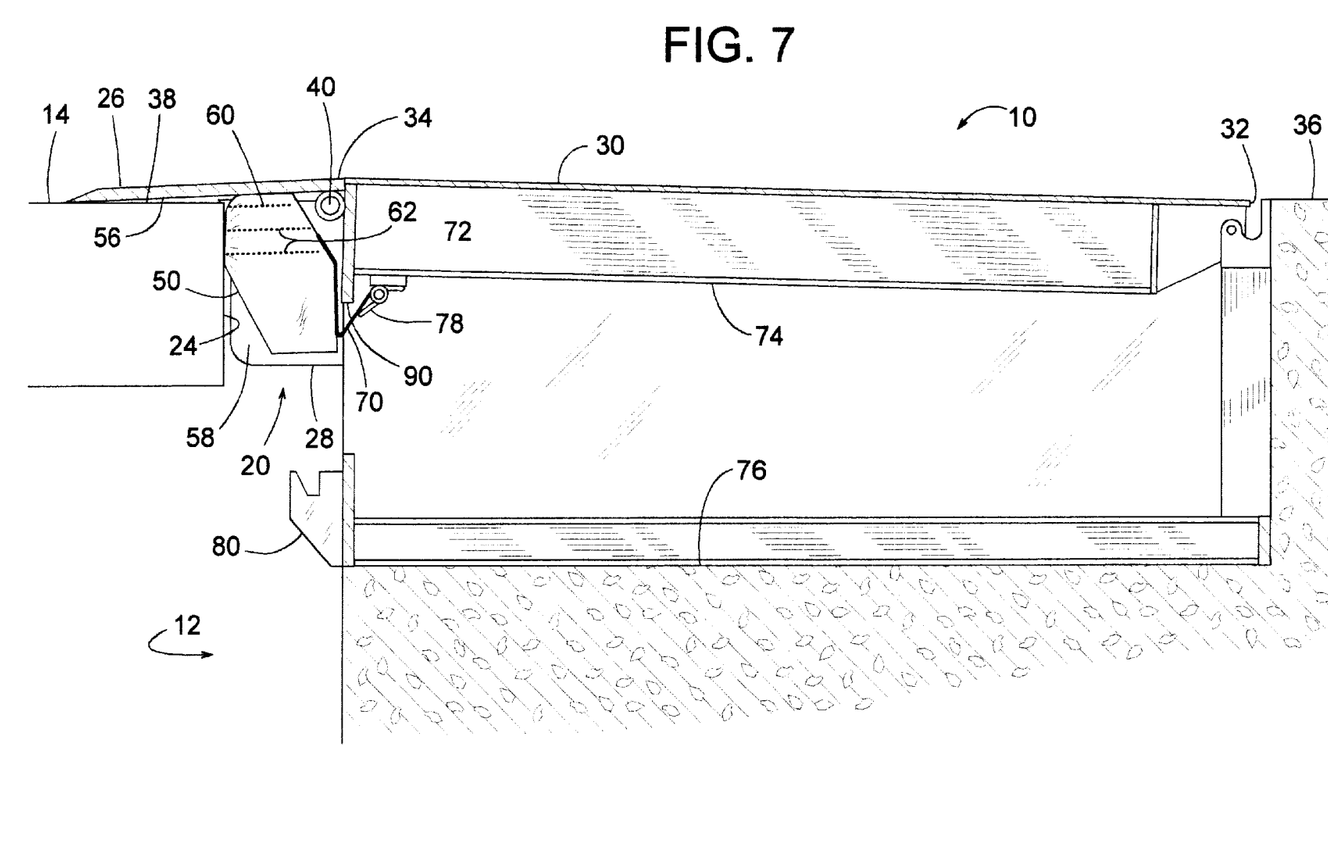
FIG. 7 is similar to FIG. 6, but with the dock leveler in an operative position with the lip resting atop the bed of the vehicle.

In FIG. 6, as deck 30 continues its descent, an inclined surface 86 of seal member 50 begins engaging back edge 24 of vehicle 14 at point 88. Due to surface 86 being at an angle, further descent of deck 30 causes seal member 50 to be compressed by back edge 24 of vehicle 14. The angle of surface 86 facilitates that compression In FIG. 7, lip 26 is in its extended, operative position with the underside surface 56 of lip 26 resting upon vehicle 14. In this position, lip 26 supports the weight of deck 30 and provides a bridge across which material handling equipment and personnel can travel between deck 30 and vehicle 14. Seal member 20 is shown in its operative position, compressed against back edge 24 of vehicle 14 and pressed up against the underside surface 56 of lip 26. Tabs 60 and 62 are in contact with inside surface 58 of bumper 28. It should be noted that the vehicle's bed height could be higher or lower if cargo and material handling equipment is added or removed from the vehicle, or if the bed were that of another vehicle. Nonetheless, engagement between bumper 28 and seal member 50 can still be maintained, as tabs 60 and 62 can sweep up and down across bumper 28. Also shown in this figure, is lever arm 70 being of a shape that is able to reach underneath and around a front plate 90 of deck 30, which may be considered a lowermost point of deck 30.

Figure 8:
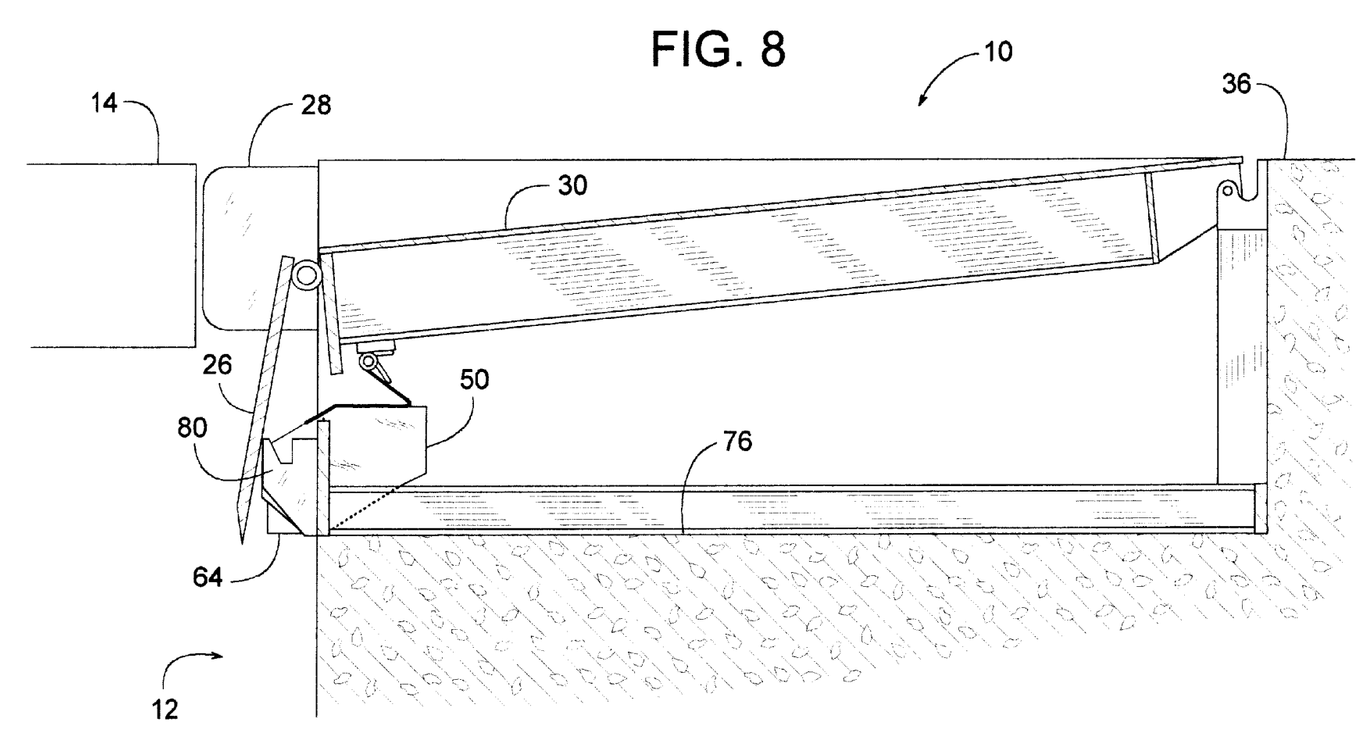
FIG. 8 is similar to FIG. 3, but with the lip pendant and unsupported by the lip keepers to allow below-dock operation.

In FIG. 8, dock leveler 10 is shown in a below-dock position, which can be useful in placing loads at the very back end of vehicle 14. In the below-dock position, deck 30 pivots below platform 36 and bottoms out, lip 26 hangs pendant with its distal edge below lip keepers 80, and seal member 50 tucks underneath deck 30. In cases where there is limited clearance underneath deck 30, seal member 50 may need to compress a little against the lower surface of pit 76.

Figure 10:
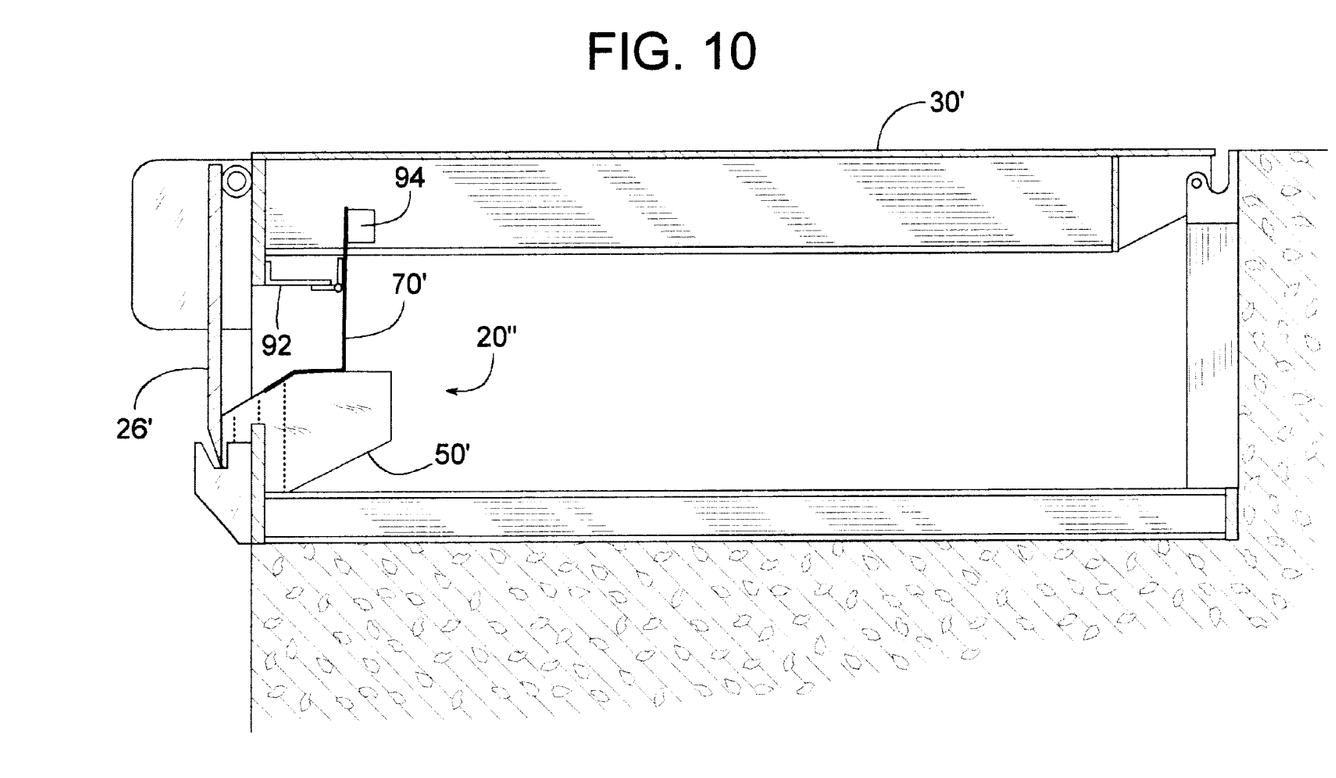
FIG. 10 is similar to FIG. 3, but of another embodiment of a lip seal.
Figure 11:
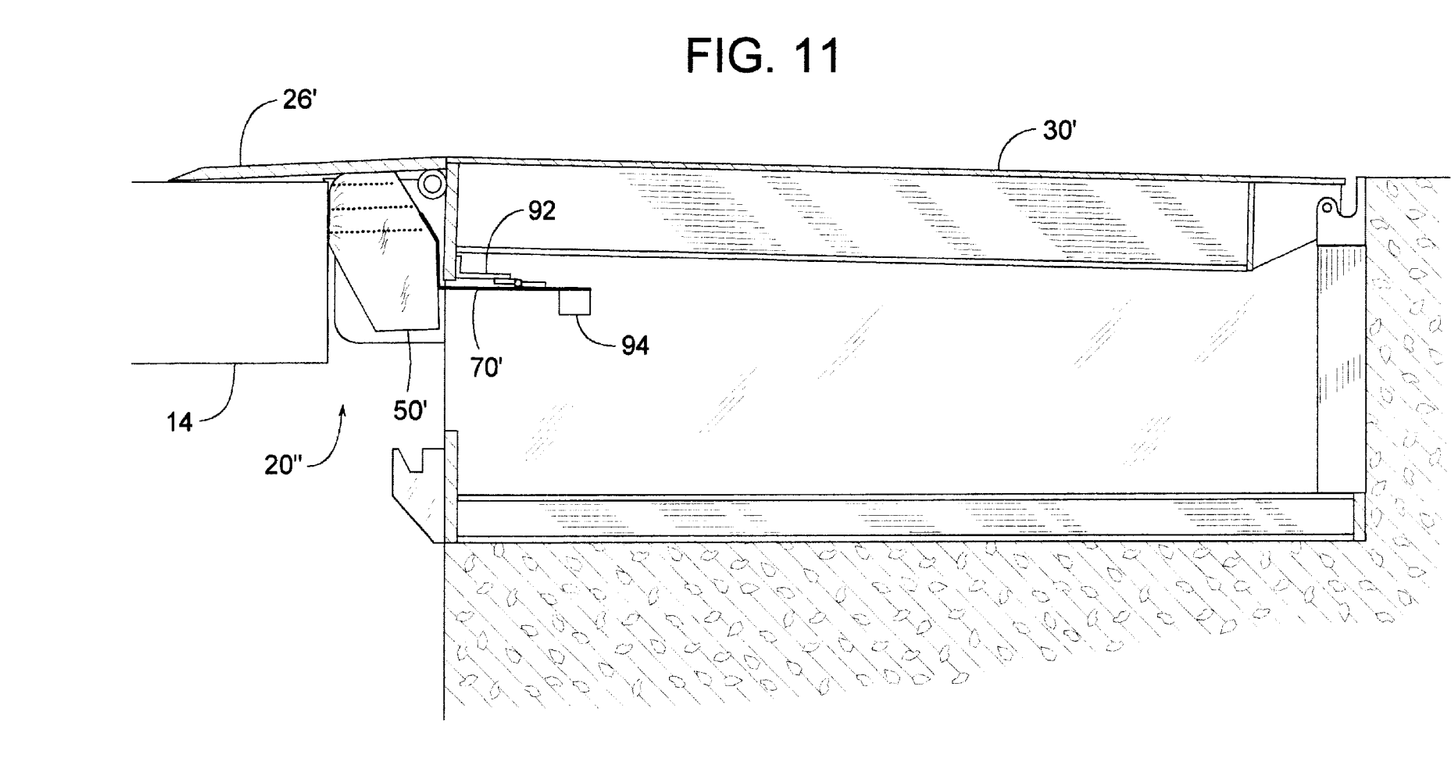
FIG. 11 is similar to FIG. 7, but showing the embodiment of FIG. 10.

In a similar embodiment, shown in FIGS. 10 and 11, lip seal 20" includes another seal member 50' pivotally attached to a deck 30' by way of a lever arm 70' hinged to a bracket 92 of deck 30'. In this example, however, a counterweight 94 attached to lever arm 70' biases seal member 50' against a lip 26'. Otherwise, the structure and operation of lip seal 20" is basically the same as lip seal 20, with FIG. 10 corresponding to FIG. 3, and FIG. 11 corresponding to FIG. 7.

Although the invention is described with respect to a preferred embodiment, modifications thereto will be apparent to those skilled in the art. Therefore, the scope of the invention is to be determined by reference to the claims, which follow.

We claim:

1. A dock leveler for use with a vehicle having an engagement surface, comprising;
   a deck that is pivotal;
   a lip moveable relative to the deck and adapted to engage the engagement surface; and
   a seal member moveable between a stored position underneath the deck and an operative position where the seal member engages the lip, wherein the seal member extends below the engagement surface when the lip is engaging the engagement surface.

2. The dock leveler of claim 1, wherein the seal member in the stored position engages the lip.

3. The dock leveler of claim 1, wherein the seal member pivots between the stored position and the operative position.

4. The lip seal of claim 1, wherein the seal member is flexible.

5. The lip seal of claim 1, wherein the seal member includes a compressible foam pad.

6. The lip seal of claim 5, wherein the seal member includes a pliable cover extending over the compressible foam pad.

7. The lip seal of claim 1, wherein the seal member includes an inclined surface adapted to engage the vehicle.

8. The lip seal of claim 1, wherein the seal member is adapted to engage the lip over an area of contact that moves as the lip moves.

9. The lip seal of claim 1, further comprising a resilient member coupled to the seal member and adapted to urge the seal member toward the lip.

10. The lip seal of claim 1, further comprising a counterweight coupled to the seal member and adapted to urge the seal member toward the lip.

11. A dock leveler for use with a vehicle, comprising:
a deck that is pivotal;
a lip moveable relative to the deck about a first axis and adapted to engage the vehicle; and
a seal member pivotal about a second axis different than the first axis, wherein the second axis is disposed underneath the deck but above a lowermost point of the deck.

12. A dock leveler for use with a vehicle, comprising;
a deck that is pivotal;
a lip moveable relative to the deck and adapted to engage the vehicle;
a bumper adapted to be engaged by the vehicle; and
a seal member extending between the lip and the bumper, the seal member having a vertical extent extending below a point of engagement between the lip and the vehicle.

13. A loading dock for use with a vehicle, comprising:
a deck that is pivotal;
a lip moveable relative to the deck and adapted to engage the vehicle, the lip being moveable from a pendant position to a fully erected position;
a bumper adapted to be engage by the vehicle; and
a seal member touching the lip and the bumper, the seal member being moveable in a lateral direction when the lip is in the fully erected position.

14. A loading dock for use with a vehicle, comprising:
a deck that is pivotal;
a lip moveable relative to the deck and adapted to engage the vehicle;
a bumper adapted to be engaged by the vehicle; and
a seal member that is moveable relative to the deck to engage the bumper, the seal member engaging the bumper below a point at which the lip engages the vehicle.

* * * * *

UNITED STATES PATENT AND TRADEMARK OFFICE
CERTIFICATE OF CORRECTION

PATENT NO. : 6,654,976 B2
DATED : December 2, 2003
INVENTOR(S) : Charles J. Digmann et al.

It is certified that error appears in the above-identified patent and that said Letters Patent is hereby corrected as shown below:

<u>Column 8,</u>
Line 15, please delete "to be engage by the vehicle" and insert -- to be engaged by the vehicle --.

Signed and Sealed this

Fifteenth Day of June, 2004

JON W. DUDAS
*Acting Director of the United States Patent and Trademark Office*